United States Patent
Guo et al.

(10) Patent No.: US 10,671,197 B2
(45) Date of Patent: Jun. 2, 2020

(54) ARRAY SUBSTRATE AND DISPLAY DEVICE

(71) Applicant: XIAMEN TIANMA MICRO-ELECTRONICS CO., LTD., Xiamen (CN)

(72) Inventors: Ke Guo, Xiamen (CN); Huangyao Wu, Xiamen (CN); Hongbo Zhou, Xiamen (CN); Zhaokeng Cao, Xiamen (CN); Xuan Lu, Xiamen (CN); Kangpeng Yang, Xiamen (CN); Yumin Xu, Xiamen (CN)

(73) Assignee: XIAMEN TIANMA MICRO-ELECTRONICS CO., LTD., Xiamen (CN)

( * ) Notice: Subject to any disclaimer, the term of this patent is extended or adjusted under 35 U.S.C. 154(b) by 0 days.

(21) Appl. No.: 16/191,354

(22) Filed: Nov. 14, 2018

(65) Prior Publication Data
US 2019/0243495 A1   Aug. 8, 2019

(30) Foreign Application Priority Data
Feb. 2, 2018 (CN) .......................... 2018 1 0107051

(51) Int. Cl.
*G06F 3/041* (2006.01)
*G06F 3/044* (2006.01)
(Continued)

(52) U.S. Cl.
CPC ........ *G06F 3/0412* (2013.01); *G02F 1/13338* (2013.01); *G02F 1/13439* (2013.01);
(Continued)

(58) Field of Classification Search
CPC ............. G06F 3/0412; G02F 1/134309; G02F 1/134336; G02F 1/13439
See application file for complete search history.

(56) References Cited

U.S. PATENT DOCUMENTS

2016/0357049 A1* 12/2016 Chen .................... G02F 1/13338
2017/0123544 A1*  5/2017 Ham ....................... G06F 3/044
(Continued)

FOREIGN PATENT DOCUMENTS

| CN | 1836188 A | 9/2006 |
|----|-----------|--------|
| CN | 104614909 A | 5/2015 |

*Primary Examiner* — Xuemei Zheng
(74) *Attorney, Agent, or Firm* — Alston & Bird LLP

(57) ABSTRACT

An array substrate includes a substrate; scan lines and data lines arranged on the substrate and intersecting one another to define sub-pixels, each of which includes a pixel electrode including strip-like electrodes whose long axes of a same row are parallel to one another. Extension lines of long axes of strip-like electrodes in sub-pixels in any two adjacent rows intersect one another. The touch electrode is electrically connected to at least one touch signal line. Each touch signal line includes straight-line portions and fold-line portions. Two adjacent straight-line portions are connected by one fold-line portion. Any straight-line portion is parallel to long axes of strip-like electrodes in sub-pixels in a same row. Extension lines of fold-line portions intersect long axes of strip-like electrodes. Orthographic projections of fold-line portions on the substrate overlap orthographic projections of scan lines on the substrate. Fold-line portions are not perpendicular to scan lines.

12 Claims, 10 Drawing Sheets

(51) Int. Cl.
*G02F 1/1333* (2006.01)
*G02F 1/1343* (2006.01)
*G02F 1/1362* (2006.01)

(52) U.S. Cl.
CPC .. *G02F 1/134309* (2013.01); *G02F 1/134336* (2013.01); *G02F 1/134363* (2013.01); *G02F 1/136286* (2013.01); *G06F 3/044* (2013.01); *G02F 2001/134345* (2013.01); *G02F 2201/121* (2013.01); *G02F 2201/122* (2013.01); *G02F 2201/123* (2013.01); *G02F 2201/52* (2013.01)

(56) References Cited

U.S. PATENT DOCUMENTS

| | | | |
|---|---|---|---|
| 2017/0192569 A1* | 7/2017 | Jeon | G06F 3/0412 |
| 2017/0336898 A1* | 11/2017 | Maede | G02F 1/133345 |
| 2019/0131324 A1* | 5/2019 | Jiang | H01L 27/1244 |
| 2019/0172882 A1* | 6/2019 | Nam | G06F 3/0443 |

* cited by examiner

ARRAY SUBSTRATE AND DISPLAY DEVICE

CROSS-REFERENCE TO RELATED APPLICATIONS

The present application claims priority to Chinese Patent Application No. CN201810107051.2, filed on Feb. 2, 2018, the content of which is incorporated herein by reference in its entirety.

TECHNICAL FIELD

The present disclosure relates to the field of display technologies and, particularly, relates to an array substrate and a display device.

BACKGROUND

In the field of liquid crystal display technologies, an in-plane switching (IPS) technique and a fringe field switching (FFS) technique are two commonly used wide viewing angle liquid crystal display techniques, characterized in that pixel electrodes and common electrodes are arranged in a same substrate such that liquid crystal molecules deflect in a plane parallel to the substrate so as to improve transmittance of a liquid crystal layer. Particularly, in the field of built-in touch based liquid crystal display technology, a major technical trend is to use a mutual capacitance mode or a self-capacitance mode using the IPS technique or FFS technique to divide the common electrodes into touch modules for time division touch.

As high power consumption of portable smart devices has become a significant problem, there is an urgent need to produce products with low power consumption, high transmittance and substantially consistent color. The industry has begun to explore a kind of display device which has favorable power consumption, bright color and built-in touch. However, there are some areas in the display device in which the severe trace mura and failure touch readily occur.

SUMMARY

The present disclosure provides an array substrate and a display device to solve the problems of poor display effect due to the trace mura and failure touch.

In a first aspect of the present disclosure, an array substrate is provided. The array substrate includes: a substrate; a plurality of scan lines arranged on the substrate; and a plurality of data lines arranged on the substrate. The plurality of data lines intersects the plurality of scan lines to define a plurality of sub-pixels. Each of the plurality of sub-pixels includes a pixel electrode. The pixel electrode includes a plurality of strip-like electrodes. Long axes of the plurality of strip-like electrodes in sub-pixels of a same row are parallel to one another. Extension lines of long axes of the plurality of strip-like electrodes in sub-pixels in any two adjacent rows intersect one another. The plurality of sub-pixels includes a plurality of columns of first type of sub-pixels and a plurality of columns of second type of sub-pixels. The plurality of columns of first type of sub-pixels and the plurality of columns of second type of sub-pixels are alternately arranged in a row direction; each column of the plurality of columns of first type of sub-pixels includes a plurality of first type of sub-pixels misaligned along a column direction. Each column of the plurality of columns of second type of sub-pixels includes a plurality of second type of sub-pixels misaligned along the column direction. The plurality of first type of sub-pixels has a transmittance larger than a transmittance of the plurality of second type of sub-pixels. The array substrate includes: a plurality of touch electrodes; and a plurality of touch signal lines. Each of the plurality of touch electrode is electrically connected to at least one of the plurality of touch signal lines. Each of the plurality of touch signal lines includes a plurality of straight-line portions and a plurality of fold-line portions. Two adjacent straight-line portions of the plurality of straight-line portions are connected to each other by one of the plurality of fold-line portions. Any straight-line portion of the plurality of straight-line portions is parallel to long axes of strip-like electrodes in sub-pixels in a same row where the any straight-line portion is located. Extension lines of the plurality of fold-line portions intersect long axes of the plurality of strip-like electrodes. Orthographic projections of the plurality of fold-line portions on the substrate overlap orthographic projections of the plurality of scan lines on the substrate but the plurality of fold-line portions is not perpendicular to the plurality of scan lines.

In a second aspect of the present disclosure, a display device is provided. The display device includes an array substrate. The array substrate includes: a substrate; a plurality of scan lines arranged on the substrate; and a plurality of data lines arranged on the substrate. The plurality of data lines intersects the plurality of scan lines to define a plurality of sub-pixels. Each of the plurality of sub-pixels includes a pixel electrode. The pixel electrode includes a plurality of strip-like electrodes. Long axes of the plurality of strip-like electrodes in sub-pixels of a same row are parallel to one another. Extension lines of long axes of the plurality of strip-like electrodes in sub-pixels in any two adjacent rows intersect one another. The plurality of sub-pixels includes a plurality of columns of first type of sub-pixels and a plurality of columns of second type of sub-pixels. The plurality of columns of first type of sub-pixels and the plurality of columns of second type of sub-pixels are alternately arranged in a row direction; each column of the plurality of columns of first type of sub-pixels includes a plurality of first type of sub-pixels misaligned along a column direction. Each column of the plurality of columns of second type of sub-pixels includes a plurality of second type of sub-pixels misaligned along the column direction. The plurality of first type of sub-pixels has a transmittance larger than a transmittance of the plurality of second type of sub-pixels. The array substrate includes: a plurality of touch electrodes; and a plurality of touch signal lines. Each of the plurality of touch electrode is electrically connected to at least one of the plurality of touch signal lines. Each of the plurality of touch signal lines includes a plurality of straight-line portions and a plurality of fold-line portions. Two adjacent straight-line portions of the plurality of straight-line portions are connected to each other by one of the plurality of fold-line portions. Any straight-line portion of the plurality of straight-line portions is parallel to long axes of strip-like electrodes in sub-pixels in a same row where the any straight-line portion is located. Extension lines of the plurality of fold-line portions intersect long axes of the plurality of strip-like electrodes. Orthographic projections of the plurality of fold-line portions on the substrate overlap orthographic projections of the plurality of scan lines on the substrate but the plurality of fold-line portions is not perpendicular to the plurality of scan lines.

DESCRIPTION OF EMBODIMENTS

The present disclosure is described in detail with reference to embodiments and the accompanying drawings. It can be understood that the described embodiments herein are merely for explaining the present disclosure rather than for limiting the present disclosure. It should also be noted that the drawings merely show structures or portions related to the present disclosure rather than all of the structures for description convenience. A same reference sign represents a same structure, element or process throughout the description. It should be noted that the embodiments and features in the embodiments can be combined with one another if no conflict is present.

Figure 1:
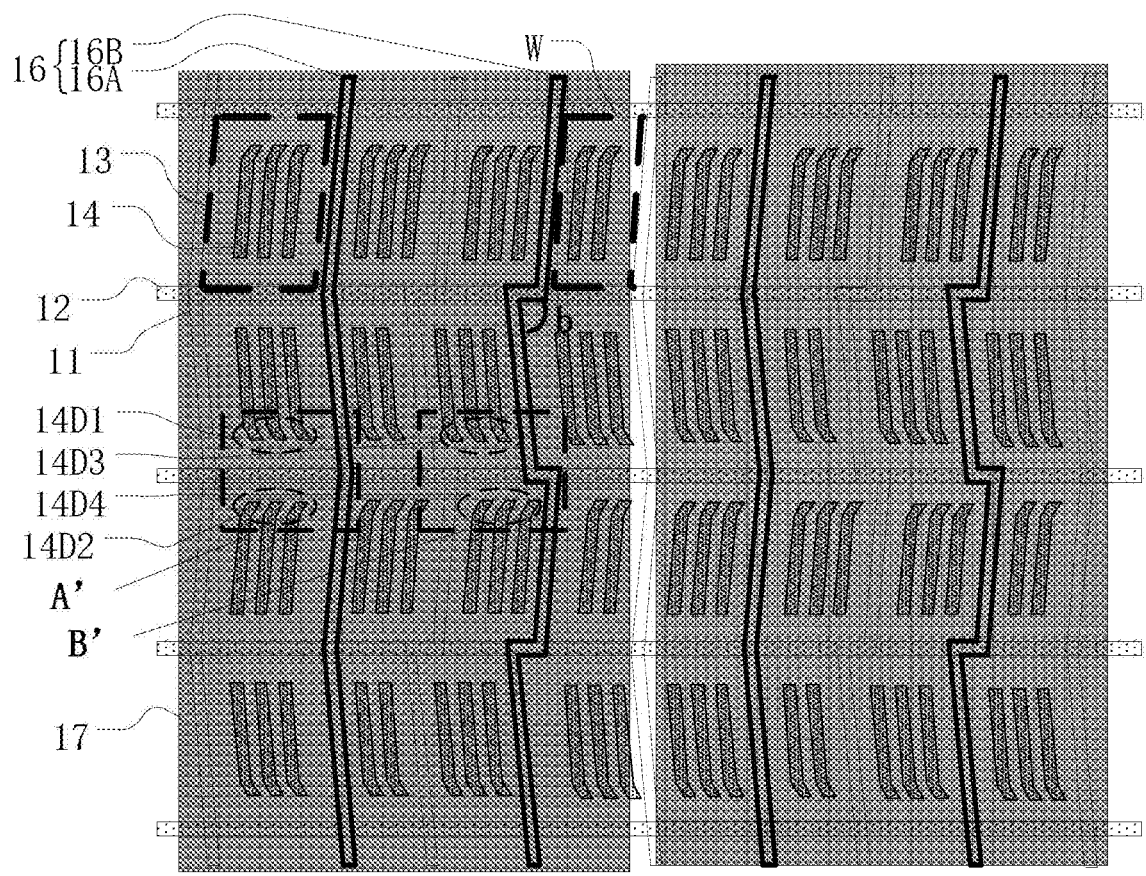
FIG. 1 is a schematic top view of an array substrate using a pseudo dual-domain technology.

At present, a pseudo dual-domain technology is widely used in the IPS technique and the FFS technique. FIG. 1 is a schematic top view of an array substrate using a pseudo dual-domain technology. A plurality of data lines 11 and a plurality of scan lines 12 are provided on the array substrate, and the plurality of data lines 11 and the plurality of scan lines 12 define a plurality of sub-pixels 13. Each sub-pixel 13 is provided with a pixel electrode 14. By using the pseudo dual-domain technology, a wider viewing angel can be obtained, thereby meeting the improved display quality demands of the user, with compared to a single-domain technology.

However, such pseudo dual-domain technology also has certain defects. For example, as for liquid crystal liquids in an area between an upper portion of the pixel electrode and a lower portion of its neighboring pixel electrode, e.g., liquid crystal molecules near both portions 14D1 and 14D2 of the neighboring pixel electrodes and liquid crystal molecules near both portions 14D3 and 14D4 of neighboring pixel electrodes in FIG. 1, effects from the upper and lower portions of neighboring pixel electrodes may cancel each other out such that these liquid crystal molecules cannot rotate toward any desired direction but keep still, resulting in phenomenon of black domain lines. When the array substrate is pressed by an external force, the liquid crystal molecules located at an interface between an upper portion of the pixel electrode and a lower portion of the pixel electrode will be disorderly arranged and drive surrounding liquid crystal molecules to move into a same arrangement as the liquid crystal molecules at the interface between the upper portion of the pixel electrode and the lower portion of the pixel electrode, resulting in an increase of an area with the black domain lines, i.e., the trace mura phenomenon, in turn negatively influencing a display effect of the liquid crystal display device. In addition, after the external forced is withdrawn, since the liquid crystal molecules located at the interface between the upper portion and the lower portion of the pixel electrodes are non-uniformly arranged, recovering directions of these liquid crystal molecules conflict with one another so that recovering slows down and some liquid crystal molecules even cannot be recovered to their original states, leading to continuing presence of the trace mura phenomenon.

A sub-pixel W usually has a smaller area than sub-pixel for regular red, green or blue colors. According to the pixel arrangement in FIG. 1, amplitudes of touch signal lines 16 at corners near intersections of the touch signal lines 16 and the scan lines 12 are significantly non-uniform, and the touch signal lines 16 are electrically connected to the touch electrodes 17 and transmit signals to the touch electrodes 17. For example, an amplitude of a touch signal line 16A in a corner area A' is smaller than an amplitude of a touch signal line 16B in area B'. Since the touch signal line 16 itself, during signal transmission, generates an electric field that interferes with rotation of liquid crystal molecules, and the touch signal line 16B in area B' has a larger amplitude, the touch signal line 16B is closer to portion 14D3 and portion 14D4 of the pixel electrodes, therefore the touch signal line 16B has higher interference to the liquid crystal molecules in area B', and the phenomenon of trace mura in area B' is severer than that in area A', thereby severely deteriorating the display effect.

An embodiment of the present disclosure provides an array substrate using the pseudo dual-domain structure. The plurality of sub-pixels of the array substrate constitutes a plurality of columns of first type of sub-pixels and a plurality of columns of second type of sub-pixels. The columns of first type of sub-pixels and the columns of second type of sub-pixels are alternately arranged along a row direction. Each column of first type of sub-pixels includes a plurality of first type of sub-pixels misaligned along a column direction. Each column of second type of sub-pixels includes a plurality of second type of sub-pixels misaligned along the column direction. Each of the first type of sub-pixels has a larger transmittance than each of the second type of sub-pixels. Under such an arrangement of sub-pixels, it is easier to regulate and control the transmittance of the sub-pixels from driving, thereby better improving the transmittance of the display device.

The array substrate further includes a plurality of touch electrodes and a plurality of touch signal lines, each touch electrode of the plurality of touch electrodes is electrically connected to at least one touch signal line of the plurality of touch signal lines, and the at least touch signal lines transmit signals to the touch electrode electrically connected thereto. Since the first type of sub-pixels constituting each column of first type of sub-pixels are misaligned along the column direction and the second type of sub-pixels constituting each column of second type of sub-pixels are misaligned along the column direction, each touch signal line includes a plurality of straight-line portions and a plurality of fold-line portions, and every two adjacent straight-line portions of the plurality of straight-line portions are connected to each other by one fold-line portion. In addition, each straight-line portion of the plurality of straight-line portions is parallel to long axle of strip-like electrodes in a row where the straight-line portion is located. An extension line of each fold-line portion of the plurality of fold-line portions intersects with the long axes of the strip-like electrodes. Orthographic projections of the plurality of fold-line portions on the substrate overlap orthographic projections of a plurality of scan lines on the substrate but the plurality of fold-line portion are not perpendicular to the plurality of scan lines. Under the special arrangement of the sub-pixels in the embodiments of the present disclosure, each touch signal line includes straight-line portions and fold-line portions, and the straight-line portions and the fold-line portions are specially oriented and arranged in such a manner that the phenomenon of non-uniform amplitudes of the corners of the touch signal line at intersection between the touch signal line and the scan line of the array substrate using the pseudo dual-domain technology as shown in FIG. 1 can be avoided. Moreover, in the embodiments of the present disclosure, the fold-line portions of the touch signal lines are all far away from the upper and lower end portions of the pixel electrodes. Therefore, when the touch signal lines transmit signals, the electric fields generated by the touch signal lines have small interference to the deflection of the liquid crystals, thereby eliminating the phenomenon of severe trace mura present in some area in the array substrate and the display device, improving display effect while reducing resistance and parasite capacitance of the touch signal lines, improving touch precision and reducing occurrence of bad touch.

The above is the core idea of the present disclosure. The technical solutions in the embodiments of the present disclosure will be clearly and completely described with reference to the accompanying drawings. Based on the embodiment of the present disclosure, all other embodiments obtained by those skilled in the art without any creative labor shall fall into the protection scope of the present disclosure. It should be noted that the embodiments and the features in the embodiments of the present disclosure can be combined with one another if no conflict.

Figure 2:
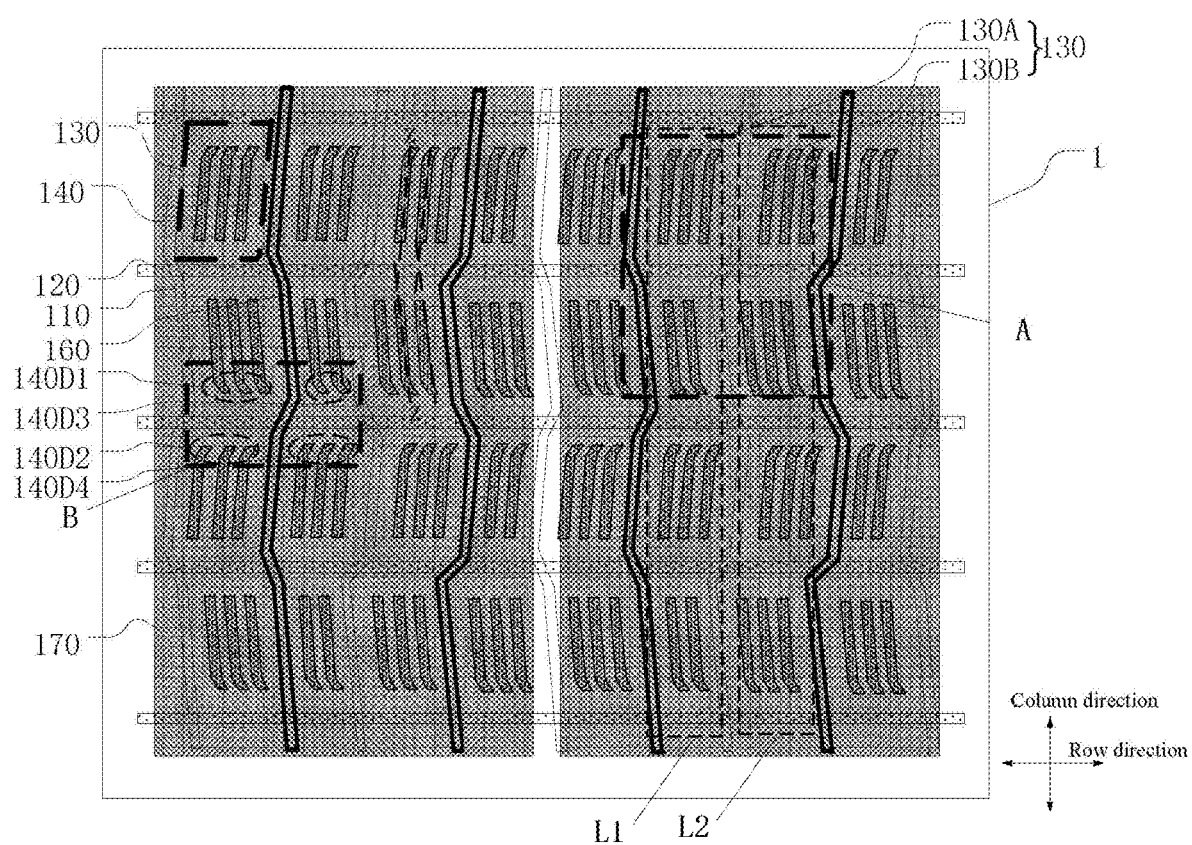
FIG. 2 is a schematic top view of an array substrate according to an embodiment of the present disclosure.
Figure 3:
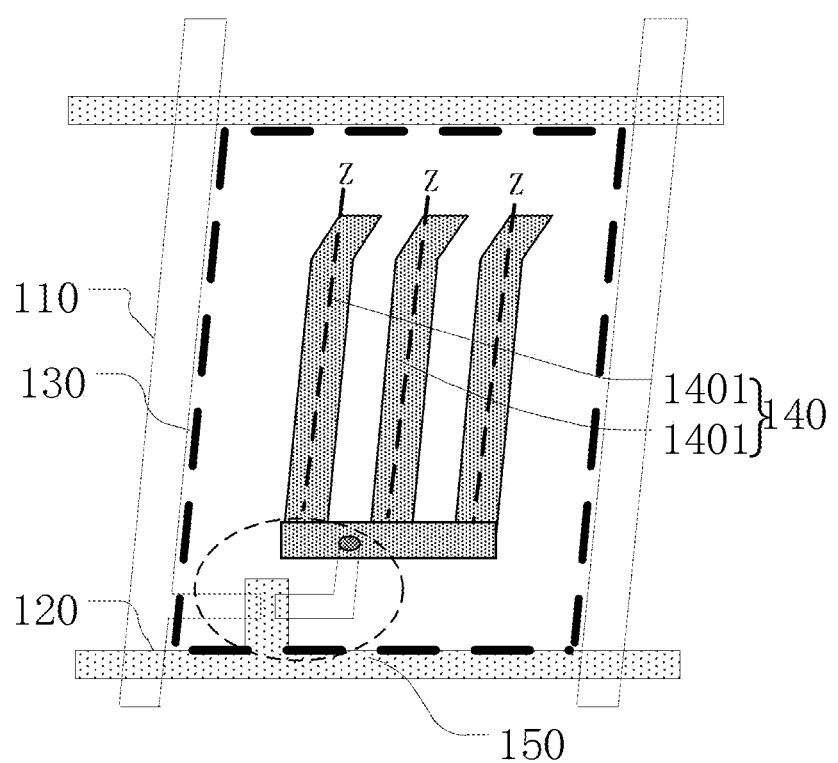
FIG. 3 is an enlarged schematic diagram showing a structure of a sub-pixel in FIG. 2.

FIG. 2 is a schematic top view of an array substrate according to an embodiment of the present disclosure; and FIG. 3 is an enlarged schematic diagram showing a structure of sub-pixels in FIG. 2. Referring to FIG. 2 and FIG. 3, the array substrate includes a substrate 1, and a plurality of scan lines 120 and a plurality of data lines 110 arranged on the substrate 1. The plurality of scan lines 120 and the plurality of data lines 110 intersect one another to form a plurality of sub-pixels 130. There is a pixel electrode 140 and a thin film transistor 150 arranged on each sub-pixel 130. A gate electrode of the thin film transistor 150 is connected to the scan lines 120, and a source electrode and a drain electrode of the thin film transistor 150 are connected to the data lines 110 and the pixel electrode 140, respectively. The pixel electrode 140 includes a plurality of strip-like electrodes 1401, long axes Z of strip-like electrodes 1401 in the same row of sub-pixels 130 are parallel to one another, extension lines of long axes Z of two strip-like electrodes 1401 in any two adjacent rows of sub-pixels 130 intersects with each other to form a pseudo dual-domain structure, which provides a wider viewing angel than a single domain structure, so as to meet the higher requirements regarding display quality. It should be noted that the present disclosure has no limitation on the specific shape of the strip-like electrodes 1401. In the embodiments of the present disclosure, strip-like electrodes with corners at the ends are taken as an example, e.g., strip-like electrodes 140D1, 140D2, 140D3 and 140D3 as shown in FIG. 2. In some embodiments, there is no corner at the ends of the pixel electrodes, and in still some embodiments, the pixel electrodes may have corners in various shapes.

Figure 4:
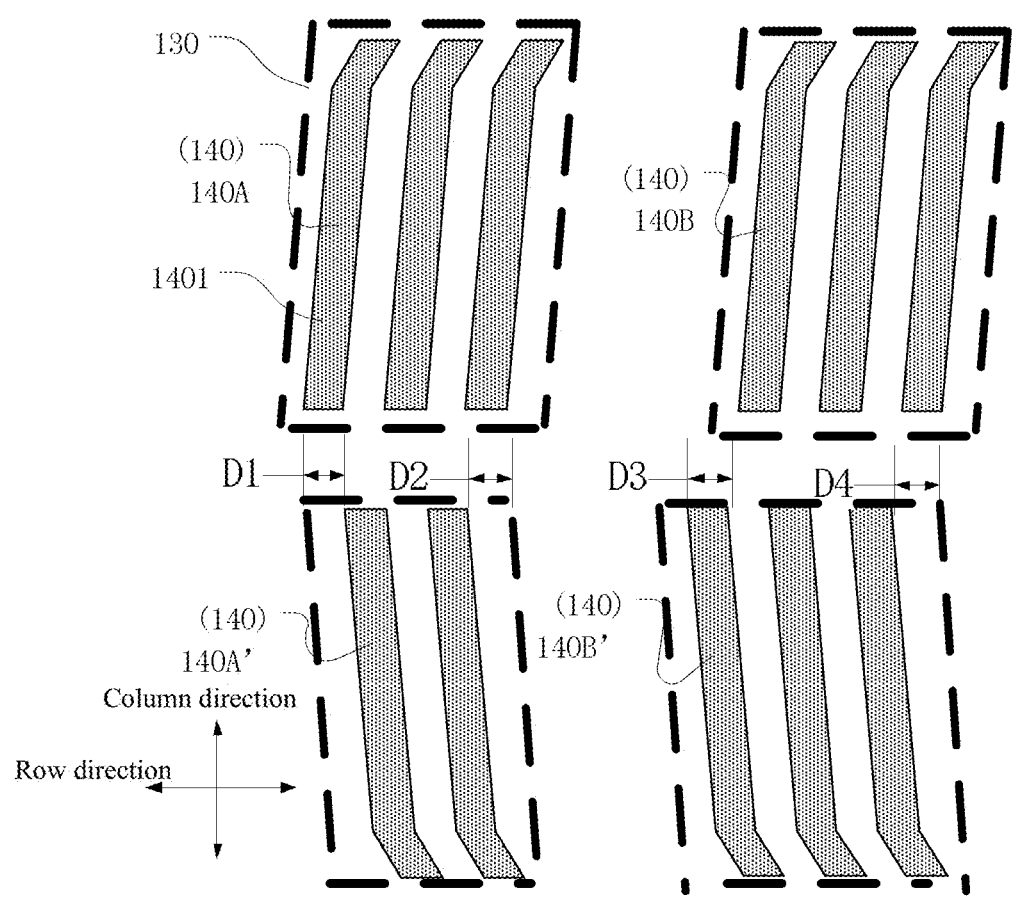
FIG. 4 is an enlarged schematic diagram of an area A in FIG. 2.

FIG. 4 is an enlarged schematic diagram of an area A in FIG. 2. Referring to FIG. 2 and FIG. 4, the plurality of sub-pixels 130 includes a plurality of columns of first type of sub-pixels L1 and a plurality of columns of second type of sub-pixels L2, the plurality of columns of first type of sub-pixels L1 and the plurality of columns of second type of sub-pixels L2 are alternately arranged along the row direction. Each column of first type of sub-pixels L1 includes a plurality of first type of sub-pixels 130A misaligned along the column direction, and each column of second type of sub-pixels L2 includes a plurality of second type of sub-pixels 130B misaligned along the column direction. In the embodiments of the present disclosure, the misalignment refers to an arrangement in which the pixel electrodes 140 included in any two adjacent sub-pixels 130 in each column of first type of sub-pixels L1 or each column of second type of sub-pixels L2 are not aligned with each other in the column direction, that is, outermost portions of the pixel electrodes 140 are not aligned with each other but offset from each other at a certain distance in the row direction. Taking the two rows and two columns of sub-pixels 130 in the area A of FIG. 2 for example, in combination of FIG. 4, the two sub-pixels 130 in a same column includes pixel electrodes 140A, 140A' or pixel electrodes 140B, 140B'. Each pixel electrode 140 includes a plurality of strip-like electrodes 1401. In the row direction, outermost portions of outermost strip-like electrodes 1401 of the pixel electrode 140A and outermost portions of outermost strip-like electrodes 1401 of the pixel electrode 140A' are not aligned with each other but offset from each other respectively at a distance of D1 and a distance of D2; and outermost portions of outermost strip-like electrodes 1401 of the pixel electrode 140B and outermost portions of outermost strip-like electrodes 1401 of the pixel electrode 140B' are not aligned with each other either but offset from each other respectively at a distance of D3 and a distance of D4. All the first type of sub-pixels 130A included in each column of first type of sub-pixels L1 are misaligned in the column direction, and all the second type of sub-pixels 130B included in each column of second type of sub-pixels L2 are also misaligned in the column direction.

The first type of sub-pixels 130A have a larger transmittance than the second type of sub-pixels 130B. It should be noted the first type of sub-pixels 130A having a larger transmittance refer to sub-pixels that have high light transmittance to provide high luminance. In some embodiments, when the array substrate includes red sub-pixels, green sub-pixels, blue sub-pixels and white sub-pixels, the white sub-pixels have larger light transmittance than other sub-pixels. Specifically, compared with the conventional display device only including red sub-pixels, green sub-pixels and blue sub-pixels, under the premise of achieving images of the same brightness on the two types of display devices, the white sub-pixels can provide the portion of brightness can be is achieved when the red sub-pixels, green sub-pixels, and blue sub-pixels of the conventional display device are all illuminated, that is to say, the white sub-pixels contribute more to the brightness of the array substrate.

With respect to the red sub-pixels, green sub-pixels and blue sub-pixels, red light is in a range of $3.9\sim4.8\times10^{14}$ Hz, green light is in a range of $5.2\sim6.1\times10^{14}$ Hz, blue light is in a range of $6.1\sim6.7\times10^{14}$ Hz, Human eyes are more sensitive to green light than red and blue. Therefore, compared with the red sub-pixels and the blue sub-pixels, the green sub-pixels can emit the largest amount of light that can be perceived by the human eyes, i.e., the green sub-pixels have the highest light transmittance, and green sub-pixels generally can contribute about 70% of pixel brightness.

Generally speaking, when the display device including red sub-pixels, green sub-pixels, blue sub-pixels and white sub-pixels displays images normally, the white sub-pixels and the green sub-pixels can contribute 80% or more of pixel brightness. Therefore, with compared to the red sub-pixels and the blue sub-pixels, both the white sub-pixels and the green sub-pixels belong to the first type of sub-pixels 130A.

It should be noted that the white sub-pixels and yellow sub-pixels both belong to highlight sub-pixels. Similar with the white sub-pixels, the yellow sub-pixels also have a larger light transmittance than other sub-pixels. Therefore, when the display device includes the yellow sub-pixels, the yellow sub-pixels also belong to the first type of sub-pixels 130A.

It can be understood that different sub-pixels have different transmittances. In view of this, no matter which types of sub-pixels are included in the array substrate, each type of sub-pixels can be classified into the first type of sub-pixels 130A or the second type of sub-pixels 130B according to transmittance thereof.

Figure 5:
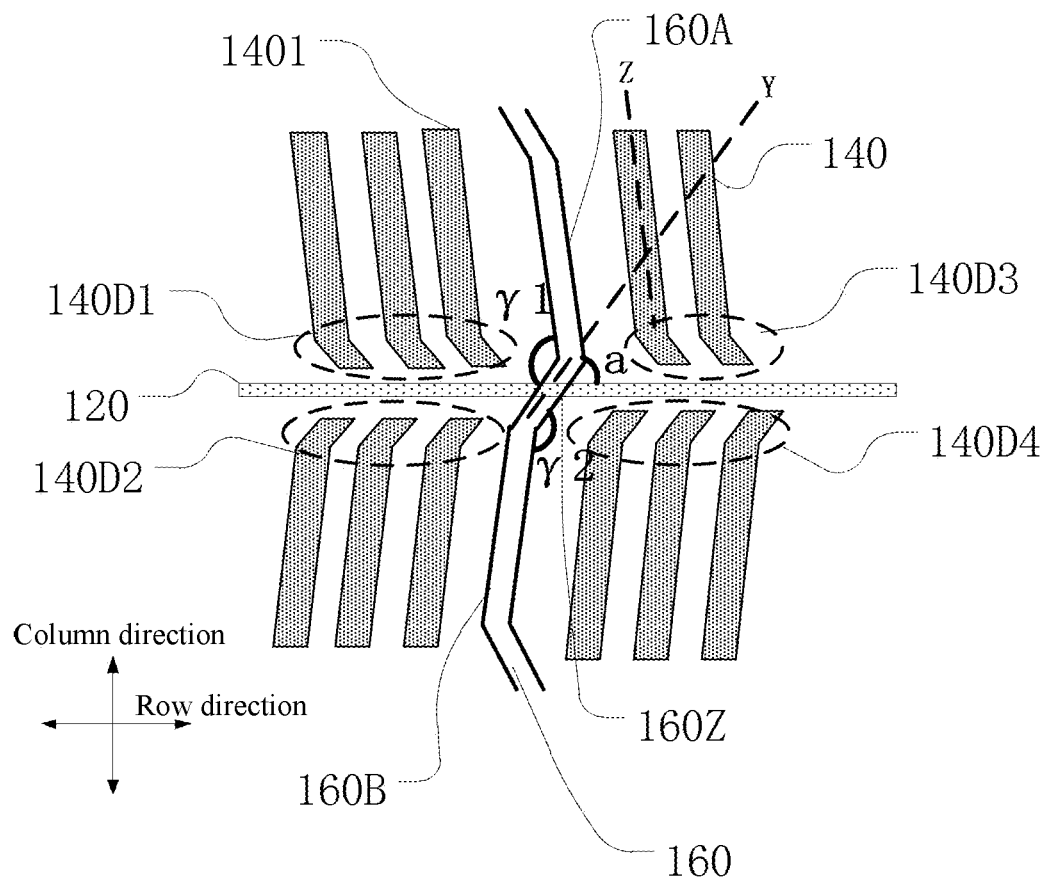
FIG. 5 is an enlarged schematic diagram of an area B in FIG. 2.

FIG. 5 is an enlarged schematic diagram of an area B in FIG. 2. Referring to FIG. 2 and FIG. 5, the array substrate further includes a plurality of touch electrodes 170 and a plurality of touch signal lines 160. Each touch electrode 170 of the plurality of touch electrodes 170 is electrically connected to at least one touch signal line 160 of the plurality of touch signal lines 160. As illustrated in FIG. 2, each touch electrode 170 is electrically connected to two touch signal lines 160. Each touch signal line 160 includes a plurality of straight-line portions and a plurality of fold-line portions. Further referring to FIG. 5, straight-line portions are denoted at 160A and 160B, a fold-line portion is denoted at 160Z, and the straight-line portion 160A/160B is parallel to long axes of strip-like electrodes 1401 in the same row of sub-pixels130 where the straight-line portion 160A/160B is located. Every two adjacent straight-line portions 160A, 160B are connected to each other by one fold-line portion 160Z. An extension line Y of the fold-line portion 160Z intersects a long axis Z of the strip-like electrodes 1401. An orthographic projection of the fold-line portion 160Z on the substrate 1 overlaps an orthographic projection of the scan line 120 on the substrate 1, thereby increasing an aperture ratio. Moreover, the fold-line portion 160Z is not perpendicular to the scan line 120, that is, an included angle α between the fold-line portion 160Z and the scan line 120 is not 90°, so that the fold-line portion 160Z of the touch signal line 160 is not too close to or too far away from ends of a part of adjacent pixel electrodes 140. As shown in FIG. 5, the included angle α between the fold-line portion 160Z and the scan line 120 is not 90°, distances between the fold-line portion 160Z and ends 140D1, 140D2 of the adjacent pixel electrodes140 and distances between the fold-line portion 160Z and ends 140D3, 140D4 of the adjacent pixel electrodes 140 are substantially the same. If the included angle between the fold-line portion 160Z and the scan line 120 is 90°, distances between the fold-line portion 160Z and the ends 140D1, 140D2 of the adjacent pixel electrodes 140 are significantly different from distances between the fold-line portion 160Z and the ends 140D3, 140D4 of the adjacent pixel electrodes 140. If the fold-line portion 160Z is too close to the ends 140D1, 140D2 of the adjacent pixel electrodes 140, when the touch signal line 160 is transmitting signals, an electric field generated by the touch signal line 160 would strongly interfere with electric fields of the ends 140D1, 140D2 of the pixel electrodes 140. Thus, deflection of liquid crystal molecules corresponding to the ends 140D1, 140D2 of the adjacent pixel electrodes 140 can be severely affected, and there is still the severe trace mura phenomenon appearing in this area of the array substrate. However, according to the embodiments of the present disclosure, by setting that the extension line Y of the fold-line portion 160Z intersects the long axis Z of the strip-like electrodes 1401, the orthographic projection of the fold-line portion 160Z on the substrate 1 can overlap the orthographic projection of the scan line 120 on the substrate 1, and the fold-line portion 160Z can be not perpendicular to the scan lines 120, thereby not only increasing the aperture ratio of the array substrate, but also avoiding the severe trace mura phenomenon in some area of the array substrate.

Figure 6:
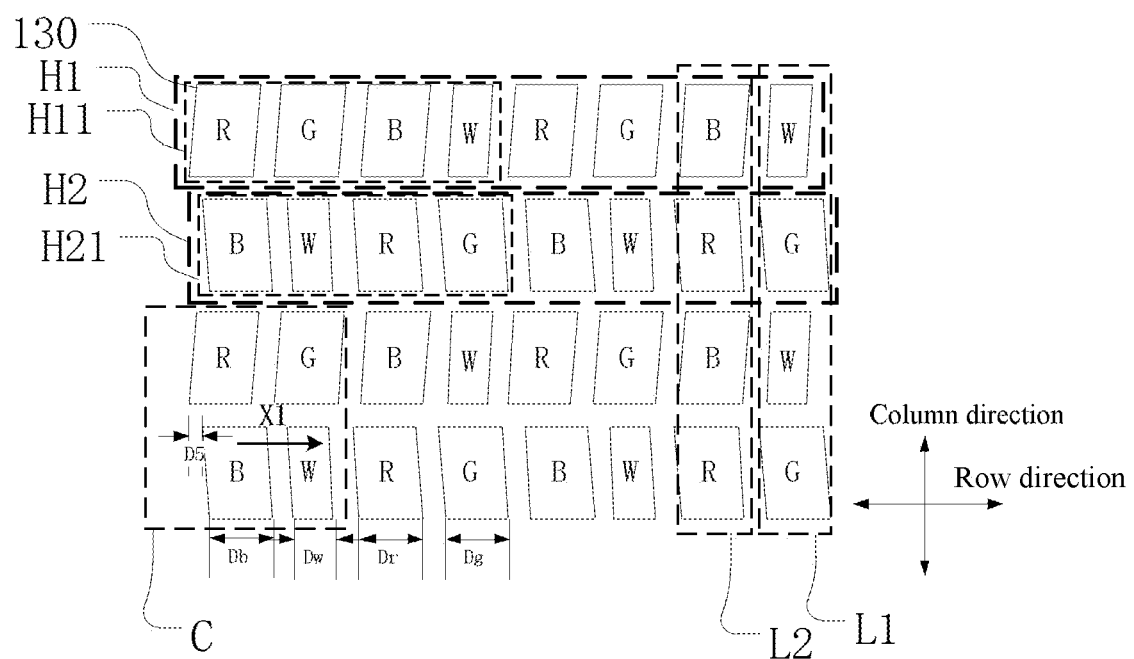
FIG. 6 is a schematic diagram showing an arrangement of sub-pixels according to an embodiment of the present disclosure.

FIG. 6 is a schematic diagram showing an arrangement of sub-pixels according to an embodiment of the present disclosure. As illustrated in FIG. 6, the plurality of sub-pixels 130 includes a plurality of rows of first pixel units H1 and a plurality of rows of second pixel units H2. A row of first pixel units H1 includes a plurality of first pixel units H11 repeatedly arranged along the row direction, a row of second pixel units H2 includes a plurality of second pixel units H21 repeatedly arranged along the row direction. The plurality of rows of first pixel units H1 and the plurality of rows of second pixel units H2 are alternately arranged in the column direction.

Each first pixel unit H11 of the plurality of first pixel units H11 includes a red sub-pixel R, a green sub-pixel G, a blue sub-pixel B, and a highlight sub-pixel W sequentially arranged along the row direction.

Each second pixel unit H21 of the plurality of second pixel units H21 includes a blue sub-pixel B, a highlight sub-pixel W, a red sub-pixel R, and a green sub-pixel G sequentially arranged along the row direction. It should be noted that the highlight sub-pixel included in the first pixel unit H11 or the second pixel unit H21 may also be a yellow sub-pixel.

Green sub-pixels G and highlight sub-pixels W in the column direction constitute a column of first type of sub-pixels L1, and red sub-pixels R and blue sub-pixels B in the column direction constitute a column of second type of sub-pixels L2.

The red sub-pixels R, the blue sub-pixels B, and the green sub-pixels G have an identical width in the row direction, and the highlight sub-pixels W have a width in the row direction smaller than a width of the red sub-pixels R in the row direction. That is, as illustrated in FIG. 6, Db=Dr=Dg>Dw. For example, in a case in which the highlight sub-pixels W are white sub-pixels, since the white sub-pixels have a high light transmittance, there would be more white light emitted from one first pixel unit H11 or one second pixel unit H21, resulting in the decreased color saturation for images. An aperture area of the white sub-pixel can be decreased by decreasing the width of the white sub-pixel in the row direction, thereby reducing the influence of the white light on the color saturation and improving the saturation. In some embodiments of the present disclosure, the width of the green sub-pixel G in the row direction is smaller than the widths of the red sub-pixel R and the blue sub-pixel B in the row direction, and the width of the green sub-pixel G in the row direction is larger than the width of the highlight sub-pixel W in the row direction, that is, Db=Dr>Dg>Dw.

A blue sub-pixel in each second pixel unit is deviated in the row direction with respect to a red sub-pixel in a first pixel unit adjacent to the second pixel unit, e.g., in a deviation direction from the blue sub-pixel towards a highlight sub-pixel in the second pixel unit. A blue sub-pixel B of a second pixel unit H21 in an area C in FIG. 6 is deviated in the row direction with respect to a red sub-pixel R of a first pixel unit H11 adjacent to the second pixel unit H21 in the area C, i.e., in a deviation direction X1 from the blue sub-pixel B towards the highlight sub-pixel W in the second pixel unit H21 at a deviation distance of D5. In other words, as compared with the top view diagram of the array substrate using the pseudo dual-domain technology of FIG. 1, each row of the plurality rows of second pixel unit H2 is deviated with respect to the plurality of rows of first pixel units H1 along the row direction X1. As compared with the top view diagram of the array substrate using the pseudo dual-domain technology of FIG. 1, if the plurality rows of second pixel unit H2 is deviated with respect to the plurality of rows of first pixel units H1 along an opposite direction of the row direction X1, the non-uniformity of the corner amplitudes of the touch signal lines can be increased, thereby resulting in the severer trace mura phenomenon.

It has been found that based on the relative position relations of respective structures in the display device, a coupling capacitance can be generated between the data lines and a plurality of structures such as the gate lines, the touch electrodes, and the touch signal lines, and in turn the coupling capacitance can result in attenuation of data signals transmitted on the data lines. Taking a liquid crystal display device as an example, it has been found upon further studies that, under a certain process condition, in an area defined by overlapping of the data lines and two gate lines, a coupling capacitance generated between the data lines and one of the two gate lines is C=1.73E-15; a coupling capacitance generated by the data lines and the other one of the two gate lines is C2=1.72E-15; a coupling capacitance generated between the data lines and the pixel electrodes is C3=8.41E-16; a coupling capacitance generated between the data lines and the touch signal lines is C4=4.93E-15; and a coupling capacitance generated between the data lines and the touch electrodes is C5=5.15E-15. Thus, as compared with other structures, there is the largest coupling capacitance generated between the data lines and the touch signal lines, that is, the touch signal lines have the greatest influence on the data signals transmitted on the data lines. In addition, according to a formula C4/(C1+C2+C3+C4+C5+C6), it can be determined that the coupling capacitance generated between the data lines and the touch signal lines is about 40% of a total coupling capacitance generated by the data lines.

In an embodiment provided by the present disclosure, data lines include a first signal line and a second data line, the first data line transmits a data signal to the first type of sub-pixels, and the second data line transmits a data signal to the second type of sub-pixels. The touch signal lines includes a plurality of first touch signal lines and a plurality of second touch signal lines. Orthographic projections of the first touch signal lines on the array substrate overlap orthographic projections of the first data lines on the array substrate, and orthographic projections of the second touch signal lines on the array substrate overlap orthographic projections of the second data lines on the array substrate. An overlapping area between fold-line portions of the first touch signal lines and the first data lines is smaller than an overlapping area between fold-line portions of the second touch signal lines and the second data lines.

Since the transmittance of the first type of sub-pixels is larger than the transmittance of the second type of sub-pixels, any brightness deviation of the first type of sub-pixels has a greater influence on a whole image than any brightness deviation of the second type of sub-pixels. In view of this, according to the present embodiment, when setting the touch signal lines, the overlapping area between fold-line portions of the first touch signal lines and the first data lines can be set to be smaller than the overlapping area between fold-line portions of the second touch signal lines and the second data lines, so that the coupling capacitance between fold-line portions of the first touch signal lines and the first data lines is lower than the coupling capacitance between fold-line portions of the second touch signal line and the first data lines. This can alleviate the attenuation of the data signals transmitted on the first data lines caused by the coupling capacitance, and thereby reducing the brightness deviation of the first type of sub-pixels and improving the display quality. More importantly, influence on the deflection of the liquid crystal molecules corresponding to the ends of the pixel electrodes included in the first type of sub-pixels due to the electric field generated by the fold-line portions of the first touch signal lines can be reduced when the first touch signal line are transmitting signals, thereby reducing the influence on the display effect of the trace mura phenomenon occurring in the array substrate due to the first type of sub-pixels and improving the display effect. There are various methods to achieve that the overlapping area between fold-line portions of the first touch signal lines and the first data lines is smaller than the overlapping area between fold-line portions of the second touch signal lines and the second data lines. Embodiments of the present disclosure will be described by mainly using the following two methods for illustration.

First Method

Figure 7:
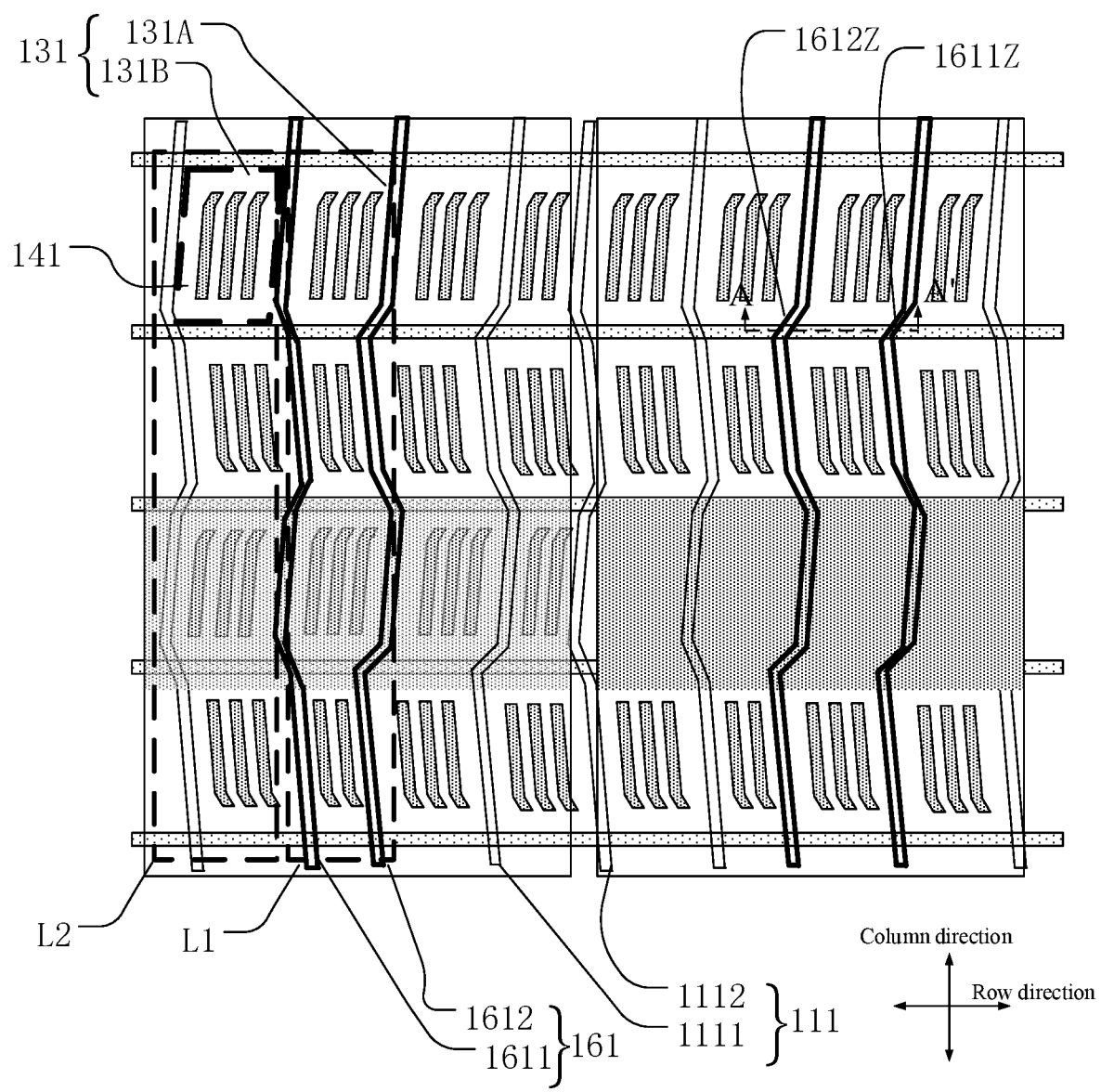
FIG. 7 is a schematic top view of another array substrate according to an embodiment of the present disclosure.
Figure 8:
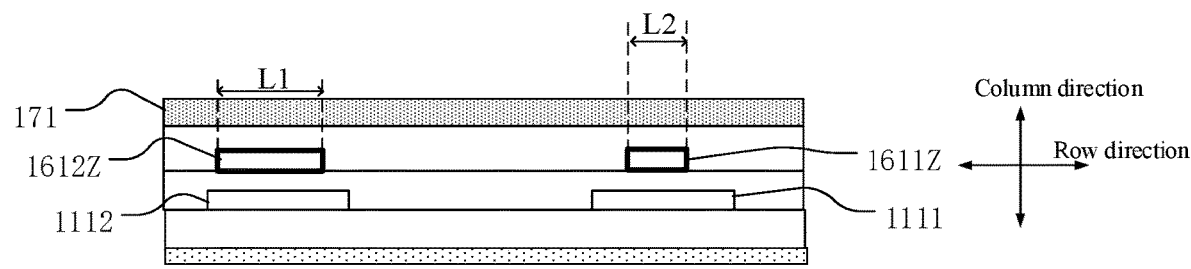
FIG. 8 is a diagram showing the cross section along a line AA' in FIG. 7.

FIG. 7 is a schematic top view of another array substrate according to an embodiment of the present disclosure, and FIG. 8 is a schematic cross section diagram along a direction AA' in FIG. 7. With reference to FIG. 7 and FIG. 8, a data line 111 includes a first data line 1111 and a second data line 1112. The first data line 1111 transmits a data signal to a first type of sub-pixels 131A, and the second data line 1112 transmits a data signal to a second type of sub-pixels 131B. The first type of sub-pixels 131A constitutes a column of first type of sub-pixels L1 in the column direction, the second type of sub-pixels 131B constitutes a column of second type of sub-pixels L2 in the column direction, and the first type of sub-pixels 131A has a larger transmittance than the second type of sub-pixels 131B.

A touch signal line 161 includes a first touch signal line 1611 and a second touch signal line 1612. An orthographic projection of the first touch signal line 1611 on the array substrate overlaps an orthographic projection of a corresponding first data line 1111 on the array substrate. An orthographic projection of the second touch signal line 1612 on the array substrate overlaps an orthographic projection of a corresponding second data line 1112 on the array substrate.

A width L2 of a fold-line portion 1611Z of the first touch signal line 1611 along the row direction is smaller than a width L1 of a fold-line portion 1612Z of the second touch signal line 1612 along the row direction. An overlapping area between the fold-line portion 1611Z of the first touch signal line 1611 and the first data line 1111 is smaller than an overlapping area between the fold-line portion 1612Z of the second touch signal line 1612 and the second data line 1112.

Second Method

The same technical features as the first method will not be described again herein. The second method differs from the first method in that the corners of the fold-line portions are designed to change an overlapping area between a fold-line portion of a touch signal line and a corresponding data line in such a manner that an overlapping area between a fold-line portion of a first touch signal line and a corresponding first data line is smaller than an overlapping area between a fold-line portion of a second touch signal line and a corresponding second data line. In the second method, each fold-line portion corresponds to one first fold-line portion and one second fold-line portion, and the one first fold-line portion and the one second fold-line portion forms an included angle. When the included angle is formed between the first fold-line portion and the second fold-line portion of the first touch signal line, it is a first included angle. When the included angle is formed between the first fold-line portion and the second fold-line portion of the second touch signal line, it is a second included angle. Both the first included angle and the second included angle are obtuse angles, and the first included angle is smaller than the second included angle. An amplitude of the included angle formed between the first fold-line portion and the second fold-line portion of the touch signal line influences a distance between the fold-line portion and the corresponding data line in the row direction, which in turn influences the overlapping area between the fold-line portion of the touch signal line and the data line, influences a coupling capacitance between the fold-line portion and the data line, and influences the attenuation of a signal on the data lines. In addition, the amplitude of the included angle formed between the first fold-line portion and second fold-line portion of the touch signal line can also influence distances between the fold-line portion and ends of the pixel electrodes in the row direction, thereby influencing the deflection of the liquid crystal molecules corresponding to the ends of the pixel electrodes. When the included angle formed between the first fold-line portion and the second fold-line portion is an acute angle, the fold-line portion will be too close to ends of pixel electrodes of a certain sub-pixel, which can aggravate the trace mura phenomenon in the corresponding area, thereby deteriorating the display effect. When the included angle formed between the first fold-line portion and the second fold-line portion is a right angle, the first fold-line portion is easily broken from the second fold-line portion during manufacturing. When the included angle between the first fold-line portion and the second fold-line portion is an obtuse angle, not only the fold-line portion is not easily broken, but also the phenomenon that the fold-line portion is too close to ends portion of pixel electrodes of a certain sub-pixel in the row direction will not occur, and thus the severe trace mura phenomenon in some area of the substrate will not occur.

Figure 9:
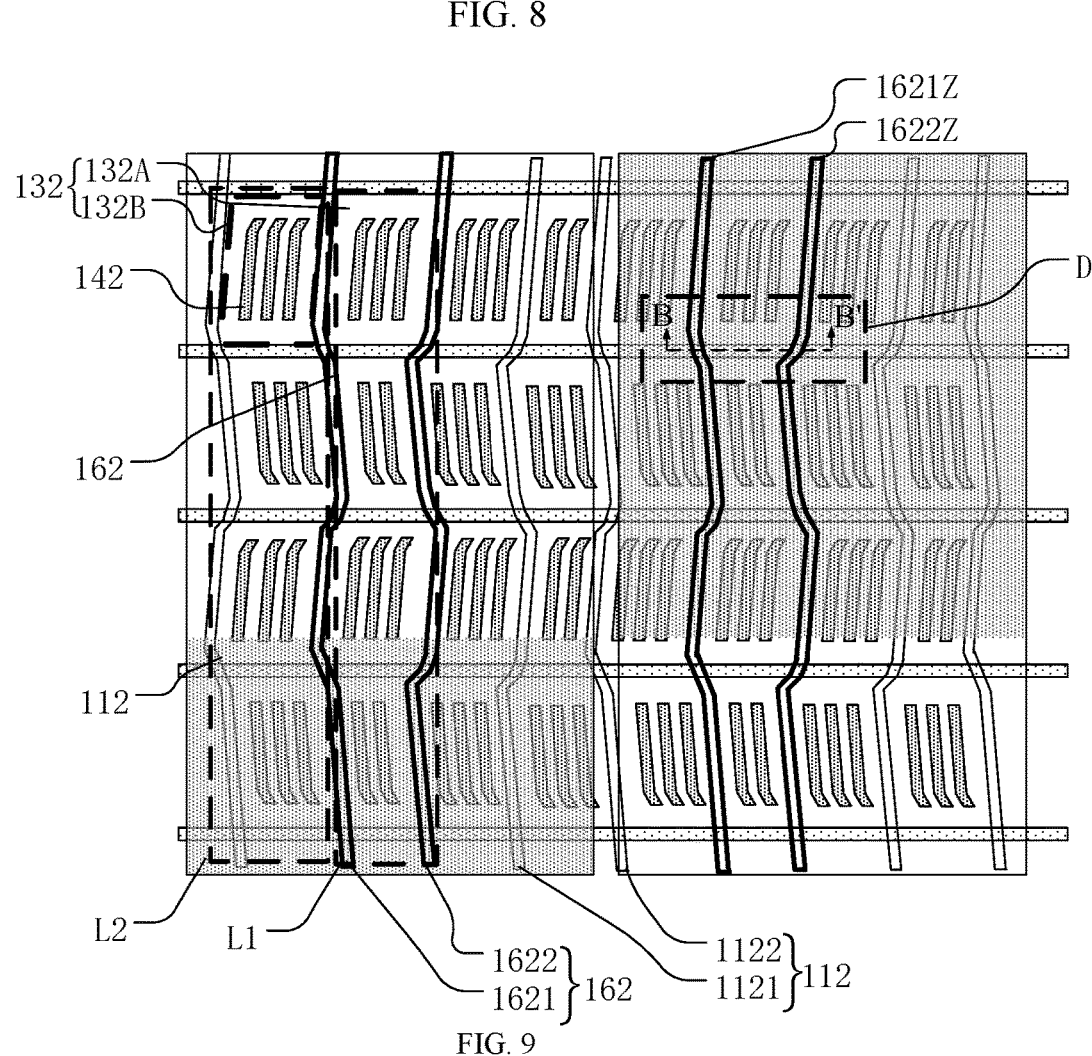
FIG. 9 is a schematic top view of another array substrate according to an embodiment of the present disclosure.
Figure 10:
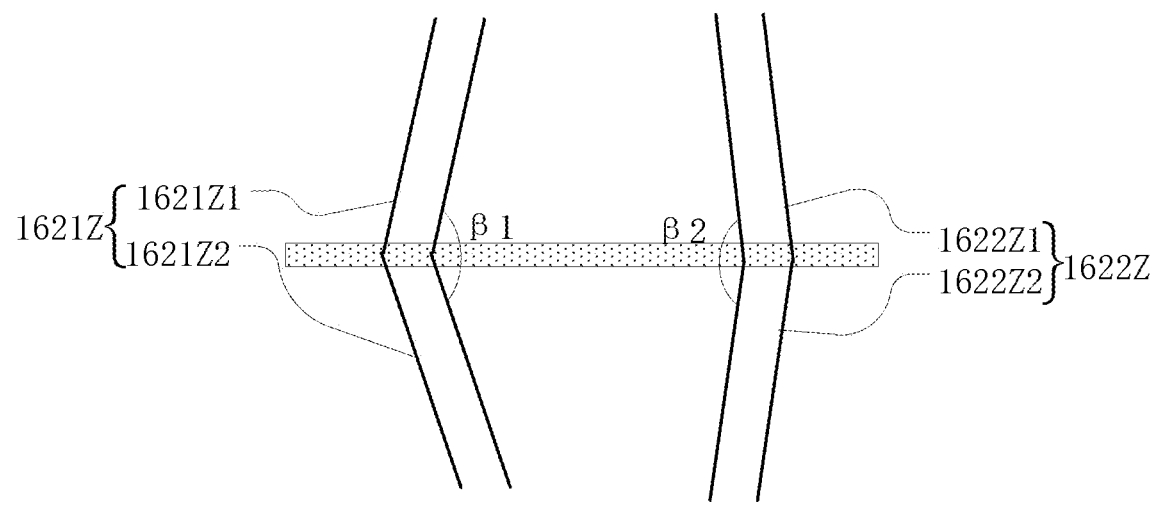
FIG. 10 is a partial enlarged schematic diagram of an area D in FIG. 9.
Figure 11:
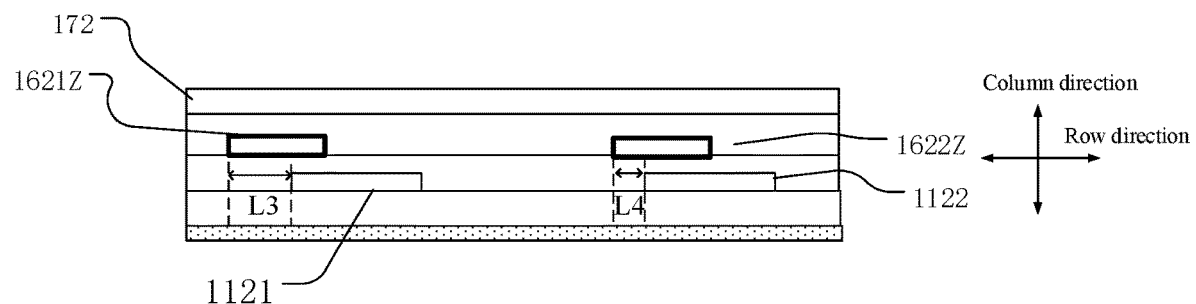
FIG. 11 is a diagram showing the cross section along a line BB' in FIG. 9.

FIG. 9 is a schematic top view of another array substrate according to an embodiment of the present disclosure, FIG. 10 is a partial enlarged schematic diagram of an area D in FIG. 9, and FIG. 11 is a schematic cross section diagram along a direction BB' in FIG. 9. With reference to FIG. 9, FIG. 10 and FIG. 11, a fold-line portion 1621Z of a first touch signal line 1621 includes a first fold-line portion 1621Z1 and a second fold-line portion 1621Z2, and an included angle formed between the first fold-line portion 1621Z1 and the second fold-line portion 1621Z2 is a first included angle β1. A fold-line portion 1622Z of a second touch signal line 1622 includes a first fold-line portion 1622Z1 and a second fold-line portion 1622Z2, and an included angle formed between the first fold-line portion 1622Z1 and the second fold-line portion 1622Z2 is a second included angle β2. Both first included angle β1 and the second included angle β2 are obtuse angles. Moreover, the first included angle β1 is smaller than the second included angle β2. That is, a distance L3 between the fold-line portion 1621Z of the first touch signal line 1621 and the first data line 1121 in the row direction is larger than a distance L4 between the fold-line portion 1622Z of the second touch signal line 1622 and the second data line 1122 in the row direction, and an overlapping area between the fold-line portion 1621Z of the first touch signal line 1621 and the first data line 1121 is smaller than an overlapping area between fold-line portion 1622Z of the second touch signal line 1622 and the second data line 1122.

It should be noted that the first method and the second method can be combined in some embodiments of the present disclosure. That is, a width of the fold-line portion of the first touch signal line in the row direction is smaller than a width of the fold-line portion of the second touch signal line in the row direction, and the first included angle formed between the first fold-line portion and the second fold-line portion of the first touch signal line is smaller than the second included angle formed between the first fold-line portion and the second fold-line portion of the second touch signal line.

Optionally, in another embodiment of the present disclosure, an included angle between a fold-line portion of each touch signal line and an adjacent straight-line portion is an obtuse angle. With reference to the touch signal line 16 shown in FIG. 1, the touch signal line 16A includes only straight-line portions but no fold-line portion, the touch signal line 16B includes both straight-line portions and fold-line portions, and none of included angles between the straight-line portions and adjacent fold-line portions is an obtuse angle. For example, the included angle b formed between the straight-line portion and the fold-line portion of the touch signal line 16B shown in FIG. 1 is an acute angle. The touch signal line plays a role for shielding the electric field generated by the data line, which then can solve the problems of light leakage and the poor display effect resulted therefrom due to voltage fluctuation of the data line, thereby improving the display effect. After many experiments, it has been found that when an included angle between a straight-line portion and an adjacent fold-line portion of a touch signal line is an acute angle or a right angle, the fold-line portion of the touch signal line has a large turn, and therefore, more BM are required for covering the touch signal line. This can influence an aperture ratio of the display device. Moreover, when the display device is displaying a black image, a polarizer at a back surface and a polarizer at a front surface of the display device are perpendicular to each other, i.e., forming an angle of 90°, and therefore, light filtered through a bottom polarizer cannot pass through a top polarizer of the display device. However, if the included angle of the fold-line portion is an acute angel or a right angle, i.e., the fold-line portion has a large turn, a polarization direction of a polarized light will be changed due to reflection, leading to scattering. In this case, a part of the scattered light is leaked through the top polarize, thus resulting in light leakage.

Taking the embodiment shown in FIG. 5 for illustration, the two adjacent straight-line portions 160A, 160B of the touch signal line 160 are connected by the fold-line portion 160Z. Both an included angle γ1 between the straight-line portions 160A and the fold-line portion 160Z and an included angle γ2 between the straight-line portions 160B and the fold-line portion 160Z are obtuse angles. That is, a turning angle of a fold-line portion of each touch signal line is changed so that all included angles between fold-line portions and adjacent straight-line portions of each touch signal line are obtuse angles, which can alleviate the light leakage, compared with the situation in which the included angles of the fold-line portions and the adjacent straight-line portions of each touch signal line are acute angles or right angles.

Optionally, in another embodiment provided by the present disclosure, an included angle between a fold-line portion and its adjacent straight-line portion of each touch signal line is larger than or equal to 160°. Optionally, further referring to FIG. 5, both the included angle γ1 between the straight-line portion 160A and the fold-line portion 160Z and an included angle γ2 between the straight-line portion 160B and the fold-line portion 160Z can be equal to 160°. Alternatively, the included angle γ1 between the straight-line portions 160A and the fold-line portion 160Z and an included angle γ2 between the straight-line portions 160B and the fold-line portion 160Z can be different form each other, e.g., the included angle γ1 is 165°, and the included angle γ2 is 170°. Embodiments of the present disclosure have no limitation on this. A light leakage-proof effect will be improved when an included angle between a fold-line portion and its adjacent straight-line portion is a large obtuse angle.

Optionally, in another embodiment provided by the present disclosure, an included angle between a fold-line portion and its adjacent straight-line portion of each touch signal line is larger than or equal to 175°. After many experiments, it has been found that when an included angle between a fold-line portion and its adjacent straight-line portion of each touch signal line is larger than 175°, i.e., the included angle between the fold-line portion and its adjacent straight-line portion of the touch signal line is substantially a flat angle of 180°, the scattering can be avoided as much as possible, thereby avoiding light leakage. Even if there is any reflection, it would be mirror reflection, which will not significantly change the polarization direction of the original light.

Optionally, in another embodiment provided in the present disclosure, the plurality of touch electrodes are arranged in an array, that is, the touch electrodes are arranged in M rows and N columns, and both M and N are positive integers greater than or equal to 2. The plurality of touch electrodes is reused as common electrodes. The common electrodes and the pixel electrodes can be arranged in such a manner that an electric field is generated for controlling the deflection of the liquid crystals, thereby achieving display. Among touch electrodes of a same row, a ratio of the number of touch signal lines electrically connected to one touch electrode to the number of touch signal lines electrically connected to any other touch electrode is in a range of 3/4-4/3. The number of touch signal line electrically connected to each touch electrode can influence a total resistance value of the touch signal lines, which then influences the attenuation degree of the signal transmitted on the touch signal lines, possibly resulting in displaying the hopping split-screen phenomenon. For example, among the touch electrodes of a same row, when there are a touch electrode electrically connected to one touch signal line and there is a touch electrode electrically connected to two touch signal lines, it has been found that the split-screen phenomenon would occur and in this situation, the ratio is 0.5-2. When there are a touch electrode electrically connected to two touch signal lines and a touch electrode electrically connected to three touch signal lines, it has been found that the split-screen phenomenon would occur too and the ratio in this situation is 2/3~3/2. When there is a touch electrode electrically connected to three touch signal lines and a touch electrode electrically connected to four touch signal lines, it has been found that the split phenomenon would weaken and the ratio is 3/4~4/3. Further, when the ratio of the number of touch signal lines electrically connected to one touch electrode to the number of touch signal lines electrically connected to any other touch electrode in a same row is in a range of 3/4-4/3, the touch signal lines electrically connected to each touch electrode have substantially equal resistances, which can reduce the risk of screen splitting.

Optionally, in another embodiment provided based on the above embodiments, a length ratio of any two touch signal lines electrically connected to touch electrodes in a same row is in a range of 0.9-1.1. With reference to the touch signal line 16 in the schematic top view of an array substrate using a pseudo dual-domain technology in FIG. 1, since an area of the sub-pixel W in FIG. 1 is generally smaller than an area of the sub-pixel R, G or B, the arrangement of the sub-pixels of FIG. 1 may lead to significant non-uniformity of the amplitudes of the corners occurring at the intersections between the touch signal lines 16 and the scan lines 12. For example, an amplitude of a corner of the touch signal line 16A in area A' is significantly smaller than an amplitude of a corner of the touch signal line 16B in area B'. Thus, the touch signal line 16A has a length significantly smaller than a length of the touch signal line 16B, that is, the widths of the touch signal line 16A and the touch signal line 16B electrically connected to the same touch electrode 17 are significantly different from each other. As a result, the attenuation situation of the signal transmitted on the touch signal line 16A is significantly different from the attenuation situation of the signal transmitted on the touch signal line 16B so that two horizontally adjacent touch signal lines 16A, 16B electrically connected to the same touch electrode 17 have different loads. When the touch electrodes 17 are reused as common electrodes, in a display phase, the touch signal lines 16A, 16B transmit a common signal to the same touch electrode 17 electrically connected thereto, it is possible that the attenuation situation of the signal transmitted on the touch signal line 16A is different from the attenuation situation of the signal transmitted on the touch signal line 16B would occur, resulting in the trace mura phenomenon and the poor display effect. Similarly, when the lengths of the touch signal lines electrically connected to the same touch electrode are significantly different form one another, lengths of touch signal lines electrically connected to touch electrodes in a same row would be significantly different form one another too, resulting in the poor display effect.

In the embodiments, each touch signal line includes a plurality of straight-line portions and a plurality of fold-line portions, and lengths of all touch signal lines electrically connected to touch electrodes in a same row are substantially identical, and each touch signal line electrically connected to touch electrodes in a same row has substantially identical length. This can well avoiding the trace mura phenomenon of the array substrate shown in FIG. 1. Considering certain error occurring in the process, a length ratio of any two touch signal lines 16 electrically connected to touch electrodes 17 of a same row is in a range of 0.9-1.1, which can also well avoid the trace mura phenomenon.

Optionally, a length ratio of any two touch signal lines electrically connected to common electrodes of a same row is 1.

Among the touch electrodes of a same row, when the ratio of the number of touch signal lines electrically connected to one touch electrode to the number of touch signal lines electrically connected to any other touch electrode is in a range of 3/4-4/3, and the length ratio of any two touch signal lines electrically connected to touch electrodes of a same row is in a range of 0.9-1.1, human eyes can hardly see the split-screen phenomenon, there is no trace mura, and the display effect can be significantly improved.

It should be noted that, the plurality of touch electrodes can be a plurality of self-capacitance touch electrode blocks arranged in an array in the same layer. Each touch electrode block and the ground of zero potential can constitute a capacitor. When the finger touches or gets close to the array substrate or the display device, capacitance at a touch position will increase, and then during touch detection, the touch position can be determined according to change of the corresponding capacitance. In the touch phase of the array substrate and the display device provided by embodiments of the present disclosure, since each touch signal line includes the straight-line portions and the fold-line portions, the differences in the amplitude of the corners and the length of the touch signal lines shown in FIG. 1 can be eliminated. Therefore, not only the uniformity of the touch signals can be improved, but also the resistance and the parasite capacitance of the touch signal line can be reduced, thereby improving the touch precision and reducing possibility of the bad touch.

Figure 12:
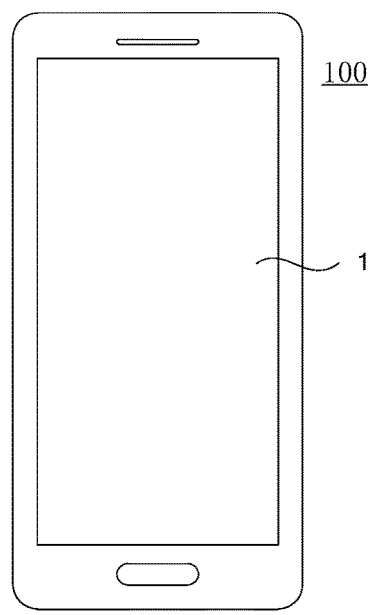
FIG. 12 is a schematic diagram of a display device according to an embodiment of the present disclosure.

Some embodiments of the present disclosure provide a display device, which includes the array substrate as mentioned above. The structural configuration of the array substrate is already described in detail in the above embodiments, and will not be described again herein. The display device can by any display terminal, such as a cell phone, a tablet computer, a laptop, a POS machine, and an on-board computer. FIG. 12 is a schematic diagram of a display device according to an embodiment of the present disclosure. In some optional embodiments, the display device 100 can be the cell phone 100 as shown in FIG. 12.

It can be known from the above embodiments that the array substrate and the display device provided in the embodiments of the present disclosure can achieve at least the following beneficial effects.

The array substrate and the display device adopt the pseudo dual-domain structure which can provide a wider viewing angle than the single-domain structure. In addition, each touch signal line in the array substrate and the display device includes straight-line portions and fold-line portions. By setting the arrangement and structural configuration of the straight-line portions and the fold-line portions, the significant non-uniformity of amplitudes the corners of the touch signal lines occurring at the intersections between the touch signal lines and the scan lines in the schematic top view of an array substrate using a pseudo dual-domain technology in FIG. 1 can be avoided. Moreover, the fold-line portions of the touch signal lines are far away from the upper and lower ends of the pixel electrodes, so that when the touch signal lines are transmitting signals, electric fields of the touch signal lines have a small interference with the deflection of the liquid crystals, thereby removing the severe trace mura phenomenon occurring in a certain area of the array substrate and the display device while improving the display effect. Moreover, this can also reduce the resistance and parasitic capacitance of the touch signal lines, and thus improve the touch precision and decreasing the probability of the bad touch.

Although some specific embodiments of the present disclosure have been illustrated in detail, those skilled in the art should understand that the above embodiments are merely for illustration, but not to limit the scope of the present disclosure. Those skilled in the art should understand modifications can be made to the above embodiments without departing from the scope of the present disclosure, and the scope of the present disclosure is defined by appended claims.

What is claimed is:

1. An array substrate, comprising:
    a substrate;
    a plurality of scan lines arranged on the substrate;
    a plurality of data lines arranged on the substrate, wherein the plurality of data lines intersects the plurality of scan lines to define a plurality of sub-pixels; wherein each of the plurality of sub-pixels comprises a pixel electrode, wherein the pixel electrode comprises a plurality of strip-like electrodes, long axes of the plurality of strip-like electrodes in sub-pixels of a same row are parallel to one another, and extension lines of long axes of the plurality of strip-like electrodes in sub-pixels in any two adjacent rows intersect one another; wherein the plurality of sub-pixels comprises a plurality of columns of first type of sub-pixels and a plurality of columns of second type of sub-pixels, the plurality of columns of first type of sub-pixels and the plurality of columns of second type of sub-pixels are alternately arranged in a row direction; wherein each column of the plurality of columns of first type of sub-pixels comprises a plurality of first type of sub-pixels misaligned along a column direction, and wherein each column of the plurality of columns of second type of sub-pixels comprises a plurality of second type of sub-pixels misaligned along the column direction; and wherein the plurality of first type of sub-pixels has a transmittance larger than a transmittance of the plurality of second type of sub-pixels;
    a plurality of touch electrodes; and
    a plurality of touch signal lines,
    wherein each of the plurality of touch electrode is electrically connected to at least one of the plurality of touch signal lines, each of the plurality of touch signal lines comprises a plurality of straight-line portions and a plurality of fold-line portions, wherein two adjacent straight-line portions of the plurality of straight-line portions are connected to each other by one of the plurality of fold-line portions, any straight-line portion of the plurality of straight-line portions is parallel to long axes of strip-like electrodes in sub-pixels in a same row along the row direction where the any straight-line portion is located, extension lines of the plurality of fold-line portions intersect long axes of the plurality of strip-like electrodes, orthographic projections of the plurality of fold-line portions on the substrate overlap orthographic projections of the plurality of scan lines on the substrate but the plurality of fold-line portions is not perpendicular to the plurality of scan lines.

2. The array substrate according to claim 1, wherein the plurality of sub-pixels comprises:
    a plurality of rows of first pixel units, wherein each row of the plurality of rows of first pixel units comprises a plurality of first pixel units repeatedly arranged along the row direction, and wherein each of the plurality of first pixel units comprises a red sub-pixel, a green sub-pixel, a blue sub-pixel, and a highlight sub-pixel sequentially arranged along the row direction; and
    a plurality of rows of second pixel units, wherein each row of the plurality of rows of second pixel units comprises a plurality of second pixel units repeatedly arranged along the row direction, and wherein each of the plurality of second pixel units comprises a blue sub-pixel, a highlight sub-pixel, a red sub-pixel, and a green sub-pixel sequentially arranged along the row direction;

wherein the plurality of rows of first pixel units and the plurality of rows of second pixel units are alternately arranged along the column direction;

wherein all green sub-pixels and all highlight sub-pixels in the column direction constitute a plurality of columns of the first type of sub-pixels, and all red sub-pixels and all blue sub-pixels in the column direction constitute a plurality of columns of the second type of sub-pixels;

wherein the red sub-pixel, the blue sub-pixel, and the green sub-pixel either in each first pixel unit or in each second pixel unit have an identical width in the row direction, and the highlight sub-pixel in each first pixel unit or in each second pixel unit has a width in the row direction smaller than a width in the row direction of the red sub-pixel either in a respective first pixel unit or in a respective second pixel unit; and wherein the blue sub-pixel of each second pixel unit is deviated in the row direction with respect to a red sub-pixel of a first pixel unit of the plurality of first pixel units adjacent to a respective second pixel unit, and a deviation direction of the blue sub-pixel is a direction from the blue sub-pixel towards a highlight sub-pixel of a respective second pixel unit.

3. The array substrate according to claim 2, wherein the plurality of data lines comprises a plurality of first data lines for transmitting data signals to the plurality of first type of sub-pixels and a plurality of second data lines for transmitting data signals to the plurality of second type of sub-pixels;

wherein the plurality of touch signal lines comprises a plurality of first touch signal lines and a plurality of second touch signal lines, orthographic projections of the plurality of first touch signal lines on the array substrate overlap orthographic projections of the plurality of first data lines on the array substrate; and orthographic projections of the plurality of second touch signal lines on the array substrate overlap orthographic projections of the plurality of second data lines on the array substrate; and wherein an overlapping area between any fold-line portion of the plurality of first touch signal lines and one of the plurality of first data lines is smaller than an overlapping area between any fold-line portion of the plurality of second touch signal lines and one of the plurality of second data line.

4. The array substrate according to claim 3, wherein any fold-line portion of the plurality of first touch signal lines has a width in the row direction smaller than a width of any fold-line portion of the plurality of second touch signal lines in the row direction.

5. The array substrate according to claim 3, wherein each fold-line portion of the plurality of touch signal lines comprises a first fold-line portion and a second fold-line portion, and the first fold-line portion and the second fold-line portion form an included angle; wherein the included angle for each fold-line portion of the plurality of first touch signal lines is a first included angle, and the included angle for each fold-line portion of the plurality of second touch signal lines is a second included angle, and both the first included angle and the second included angle are obtuse angles; and wherein the first included angle is smaller than the second included angle.

6. The array substrate according to claim 1, wherein an included angle between each fold-line portion of each of the plurality of touch signal lines and a straight-line portion adjacent to the fold-line portion is an obtuse angle.

7. The array substrate according to claim 6, wherein the included angle is larger than or equal to 160°.

8. The array substrate according to claim 6, wherein the included angle is larger than or equal to 175°.

9. The array substrate according to claim 1, wherein the plurality of touch electrodes are arranged in an array, the plurality of touch electrodes are multiplexed as common electrodes; and a ratio of a number of touch signal lines electrically connected to one touch electrode of touch electrodes of a same row to a number of touch signal lines electrically connected to any other touch electrode of the touch electrodes of the same row is in a range of 3/4-4/3.

10. The array substrate according to claim 9, wherein a length ratio of any two touch signal lines electrically connected to touch electrodes in a same row is in a range of 0.9-1.1.

11. The array substrate according to claim 10, wherein a length ratio of any two touch signal lines electrically connected to common electrodes of a same row is 1.

12. A display device, comprising an array substrate which comprises:

a substrate;

a plurality of scan lines arranged on the substrate;

a plurality of data lines arranged on the substrate, wherein the plurality of data lines intersects the plurality of scan lines to define a plurality of sub-pixels; wherein each of the plurality of sub-pixels comprises a pixel electrode, wherein the pixel electrode comprises a plurality of strip-like electrodes, long axes of the plurality of strip-like electrodes in sub-pixels of a same row are parallel to one another, and extension lines of long axes of the plurality of strip-like electrodes in sub-pixels in any two adjacent rows intersect one another; the plurality of sub-pixels comprises a plurality of columns of first type of sub-pixels and a plurality of columns of second type of sub-pixels, the plurality of columns of first type of sub-pixels and the plurality of columns of second type of sub-pixels are alternately arranged in a row direction; wherein each column of the plurality of columns of first type of sub-pixels comprises a plurality of first type of sub-pixels misaligned along a column direction, and wherein each column of the plurality of columns of second type of sub-pixels comprises a plurality of second type of sub-pixels misaligned along the column direction; and wherein the plurality of first type of sub-pixels has a transmittance larger than a transmittance of the plurality of second type of sub-pixels;

a plurality of touch electrodes; and a plurality of touch signal lines;

wherein each of the plurality of touch electrode is electrically connected to at least one of the plurality of touch signal lines, each of the plurality of touch signal lines comprises a plurality of straight-line portions and a plurality of fold-line portions, two adjacent straight-line portions of the plurality of straight-line portions are connected to each other by one of the plurality of fold-line portions, any straight-line portion of the plurality of straight-line portions is parallel to long axes of strip-like electrodes in sub-pixels in a same row along the row direction where the any straight-line portion is located, extension lines of the plurality of fold-line portions intersect long axes of the plurality of strip-like electrodes, orthographic projections of the plurality of fold-line portions on the substrate overlap orthographic projections of the plurality of scan lines on the substrate but the plurality of fold-line portions is not perpendicular to the plurality of scan lines.

* * * * *